US012058983B2

(12) United States Patent
Rose

(10) Patent No.: US 12,058,983 B2
(45) Date of Patent: Aug. 13, 2024

(54) BEE CUP

(71) Applicant: Bee Cups, LLC, Dallas, TX (US)

(72) Inventor: Jennifer J. Rose, Dallas, TX (US)

(73) Assignee: Bee Cups, LLC, Dallas, TX (US)

( * ) Notice: Subject to any disclaimer, the term of this patent is extended or adjusted under 35 U.S.C. 154(b) by 0 days.

(21) Appl. No.: 17/687,430

(22) Filed: Mar. 4, 2022

(65) Prior Publication Data

US 2023/0276775 A1 Sep. 7, 2023

(51) Int. Cl.
*A01K 53/00* (2006.01)

(52) U.S. Cl.
CPC .................................. *A01K 53/00* (2013.01)

(58) Field of Classification Search
CPC ........ A01K 53/00; A01K 47/00; A01K 51/00; A01K 59/00
See application file for complete search history.

(56) References Cited

U.S. PATENT DOCUMENTS

| 5,377,617 | A | * | 1/1995 | Harwich | A01K 39/01 119/6.5 |
| 2009/0311942 | A1 | * | 12/2009 | Volby | A01K 53/00 449/1 |
| 2010/0304059 | A1 | * | 12/2010 | Besson | C03C 17/00 428/34 |
| 2016/0007585 | A1 | * | 1/2016 | Jany | A01M 1/106 43/132.1 |

OTHER PUBLICATIONS

Firehouse Art Center (Year: 2021).*
Art for Bees (Year: 2020).*
"BBC News, Database shows how bees see worldin UV, Dec. 13, 2010" (Year: 2010).*
"Bee Culture, How Bees See and Why It Matters, May 20, 2016" (Year: 2016).*
Riddle, Sharla, "How Bees See and Why It Matters", Bee Culture, The Magazine of American Beekeeping; Beekeeping Today Podcast; www.beekeepingtodaypodcast.com; Feb. 27, 2022 (1 page).
Gutierrez, Grace, "Firehouse Blog-Jen Rose-Helping Pollinators Never Looked So Good", https://firehouseart.org/firehouse-blog-jen-rose-helping-pollinators-never-looked-so-good; Mar. 4, 2022 (4 pages).
"Art for Bees: Artist's Installations Help Thirsty Bees", https://www.bee-cups.com/press, May 2, 2020, Dallas, Texas (1 page).
International Search Report and Written Opinion dated Apr. 13, 2023 in connection with International Patent Application No. PCT/US2023/063799, 10 pages.

* cited by examiner

*Primary Examiner* — Joshua J Michener
*Assistant Examiner* — Henry Hooper Mudd

(57) ABSTRACT

An insect watering station includes a bowl, a stem, and an ultraviolet pattern. The bowl is configured to capture water for bees to drink. The stem is attached to an outside surface of a bowl and configured to support the bowl. The ultraviolet pattern is applied to an inside surface of the bowl. The ultraviolet pattern includes a center portion of a non-ultraviolet color, and alternating ultraviolet and non-ultraviolet concentric rings around the center portion.

20 Claims, 10 Drawing Sheets

BEE CUP

TECHNICAL FIELD

This disclosure relates generally to insect watering stations. More specifically, this disclosure relates to insect watering station to provide a water source for bees and an ultraviolet pattern for attracting bee vision.

BACKGROUND

Bees are known to provide a substantial amount of the pollination of the plants on earth. Many commercially grown crops depend on bees for sustaining crop cycles. The decline of bees in the environment is having a substantial impact on habitats that are necessary for life. Guiding bees to safe areas without pesticides and away from unclean water can help increase bee populations.

SUMMARY

This disclosure provides an insect watering station for capturing water and attracting bees and other pollinators.

In a first embodiment, an insect watering station for attracting bee includes a bowl, a stem, and an ultraviolet pattern. The bowl is configured to capture water. The stem can be attached to an outside of the bowl and configured to support the bowl. The ultraviolet pattern can be applied to an inside of the bowl and includes a center portion of a non-ultraviolet color and alternating ultraviolet and non-ultraviolet concentric rings around the center portion.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5B, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Bees have three photoreceptors that are based on the colors of green, blue, and ultraviolet. Bees do not have a photoreceptor for red and therefore reds appear as a non-ultraviolet color. Most patterns on flowers are formed using ultraviolet colors, which are visible to bees but not humans. "Bee vision" is a bee's ability to differentiate flowers with nectar from leaves, grass, etc.

Insect watering stations are tiny porcelain funnels for gardens that can collect rain or sprinkler water for thirsty bees. One example of such insect watering station is Bee Cups™ brand insect watering stations made by JenRoseArt, LLC. The insect watering stations and artificial flowers can attract bees to safe drinking water, areas with crops that need help, areas without crops that could use pollination, etc. The insect watering stations are meant to capture an amount of water for bees to drink but will evaporate in certain climates before mosquitos can lay eggs.

Figure 1A:
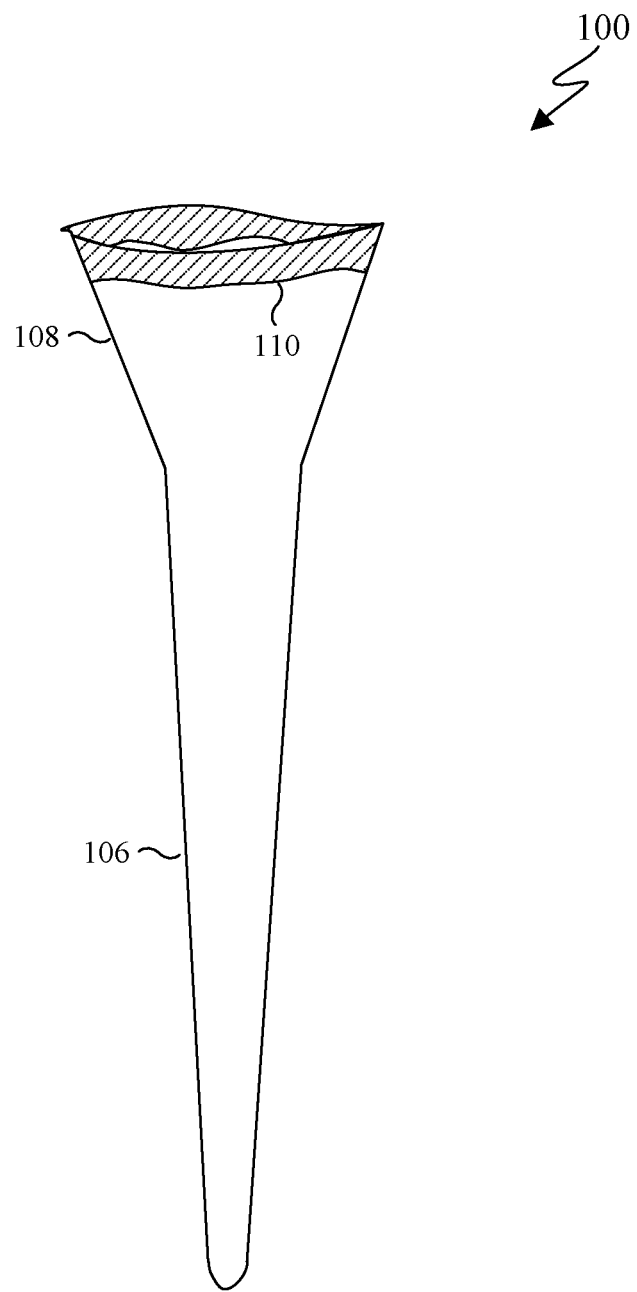
FIGS. 1A and 1B illustrate an example insect watering station with an ultraviolet ring in accordance with this disclosure.
Figure 1B:
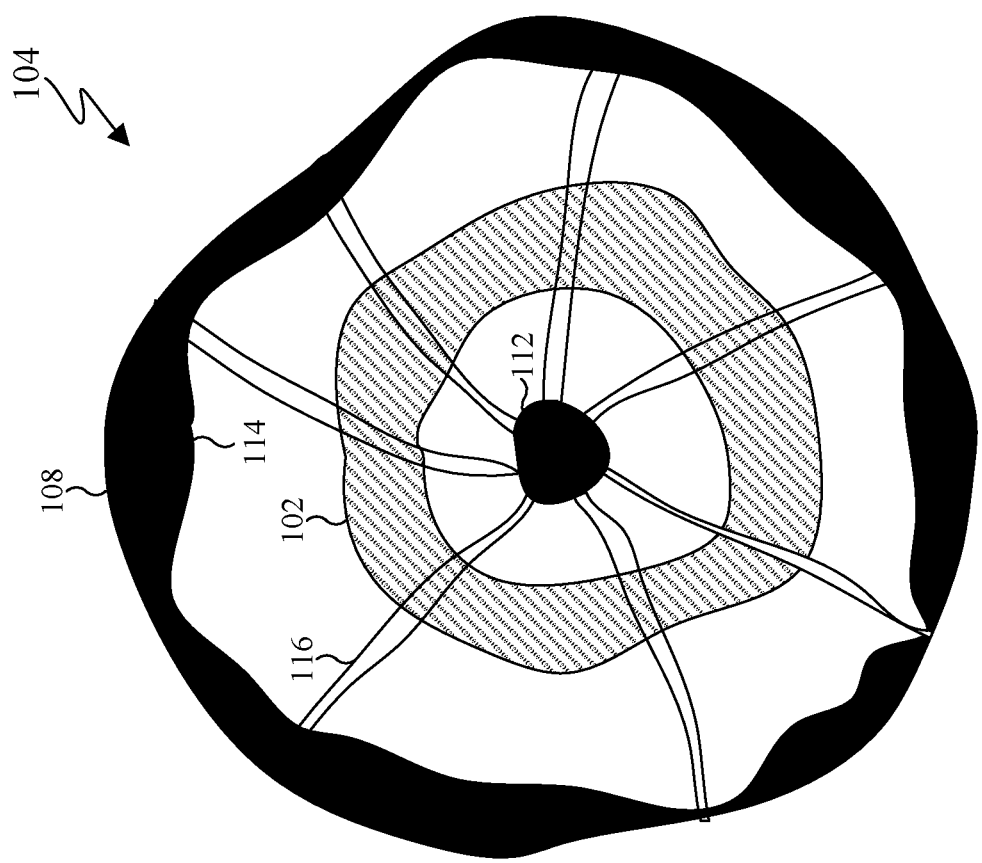

FIGS. 1A and 1B illustrate an example insect watering station 100 with an ultraviolet ring 102 in accordance with this disclosure. In particular, FIG. 1A illustrates an example insect watering station 100 and FIG. 1B illustrates an example ultraviolet pattern 104 including the ultraviolet ring 102 for an insect watering station 100.

As shown in FIG. 1A, an insect watering station 100 is designed for holding water from a source, such as rainwater, sprinklers, a hose, etc. The insect watering station 100 includes a stem 106 and a bowl 108. In certain embodiments, the overall insect watering station 100 can be three to four inches in height. However, the height of the insect watering station 100 is not limited to this range. In certain embodiments, pigments can be added to an impermeable ceramic, such as porcelain, to create an insect watering station 100 that is colored differently from a natural porcelain color. The use of pigments in clay or porcelain are light fast and do not substantially fade over time.

The stem 106 can be inserted into the ground to provide stability for the insect watering station 100. The stem 106 can connect to a bottom side of the bowl 108. The stem 106 also can elevate the bowl 108 from the ground in order to keep ground based insects from the bees drinking water out of the bowl 108. In certain embodiments, the stem can be approximately 2.5 inches to 3 inches or in a range from approximately 75% to approximately 85% of the total length of the insect watering station 100.

The bowl 108 can be shaped to hold water for bees and other pollinating insects while the amount of water can evaporate in an amount of time in most climates that would not allow mosquitos to lay eggs in the water. For example, the bowl 108 can be formed to hold a teaspoon of water. This amount of water can be a maximum amount and the bowl 108 could also hold less than a teaspoon of water. For example, the insect watering station 100 can collect volumes of a teaspoon or less, which is intended to evaporate a few hours after filling. This volume of water mimics flowers catching morning dew and water for pollinators while preventing mosquitoes accumulating.

The bowl 108 can be a height in a range from 0.75 inches to 1 inch or in a range from 15% to 25% of the length of the insect watering station 100. The slope of the bowl 108 is designed to provide support to keep bees from sliding into the water. In certain embodiments, the slope of the bowl 108 is between 25 and 30 degrees from a center axis. In certain embodiments, an inside of the bowl 108 can be designed and formed to be approximately an inch or less and hold approximately 5 cubic centimeter or less of water. A circumference of a top rim of the bowl 108 can be approximately 1 inch.

The insect watering station 100 can be made of a porcelain material or a non-plastic material. The material of the insect watering station 100 is important to maintain a healthy environment for the bees and not do further damage to the bee environment. Porcelain and other similar materials can be durable, able to hold water, and impermeable to bacteria. For example, the bowl 108 could be made of stoneware or terracotta. The stem 106 can be made from a different material than the bowl 108. For instance, the stem 106 does not need to be able to hold water, but also should be durable and impermeable to bacteria growth. In certain embodiments, an insect watering station 100 can be made from approximately 0.8 ounces of clay porcelain, which would correspond to a insect watering station that is four to six inches in height. However, the amount of material and the amount of material corresponding to a specific size range are not limited by this example. The insect watering station 100 can be heated to over 2200 degree Fahrenheit. Also, porcelain has a very low water absorption rate, which helps prevent bacteria from forming in or on the insect watering station 100. In certain embodiments, the bowl is formed of an impermeable ceramic that includes non-ultraviolet color pigments at the center portion. In certain embodiments, the bowl is formed of an impermeable ceramic that include non-ultraviolet color pigments at the non-ultraviolet concentric rings.

The bowl 108 can include a translucent portion 110. The translucent portion 110 can be a thickness where the material used to form the bowl 108 is translucent. The translucent portion 110 allows the bowl 108 to mimic translucent portion of a flower further attracting bee vision.

As shown in FIG. 1B, the inside of the bowl 108 can have an ultraviolet pattern 104 that mimics the petals and arrangement of a flower. The ultraviolet pattern 104 can include the ultraviolet ring 102, a center portion 112, an outside portion 114, and one or more textures 116. The ultraviolet pattern 104 can designed in a bullseye pattern with the "target" being the center portion 112. The bullseye pattern can be composed of alternating non-ultraviolet and ultraviolet concentric rings according to bee vision. The bullseye pattern can have a non-ultraviolet center portion 112 and a non-ultraviolet outside portion 114. While illustrated using a single ultraviolet ring 102 for a bullseye pattern, multiple ultraviolet rings 102 can be utilized in an ultraviolet pattern 104 for an insect watering station 100.

The ultraviolet ring 102 can be a glaze with rare earth minerals or formed from other methods for including ultraviolet characteristics in a glaze. The glaze can include a range of rare earth minerals from 0.25% to 12%, such as using a range from 1% to 4% rare earth minerals in a glaze. The ceramic glaze recipe provides that metals and minerals do not leach from the glass into the water, even in mildly acidic conditions. Therefore, no toxic chemicals should be ingested by the bees. However, the range of rare earth minerals is not limited to these ranges. The glaze can be applied and fired to cone 6 (^6) temperature for the glaze. Other firing temperatures are possible depending on a type of clay and glass forming glaze chemicals used in the recipe. A range of firing temperatures could be used from ^5 to ^10. For example, samarium oxide, yttrium oxide, or terbium oxide, are rare earth minerals that can be added to the glaze for the ultraviolet ring 102. These chemicals might also be used in the carbonite form instead of an oxide form.

As mentioned previously, the center portion 112 of the bowl 108 can be formed of a non-ultraviolet circle. The center portion 112 can be the material of the bowl 108 including any added pigments. The center portion 112 can also be a glaze with a different non-ultraviolet color added to a separate glaze from the ultraviolet ring 102. The center portion 112 can be an entire area of the bowl 108 inside of the ultraviolet ring 102. In certain embodiments, the non-ultraviolet color of the non-ultraviolet concentric rings is a brighter color than the non-ultraviolet color of the center portion.

As mentioned previously, the outside portion 114 of the inside of the bowl 108 can be formed of a non-ultraviolet ring. The outside portion 114 can be the material of the bowl 108 including any added pigments. The outside portion 114 can also be a glaze with a different non-ultraviolet color added to a separate glaze from the ultraviolet ring 102. The outside portion 114 can cover an entire area of the bowl 108 outside of the ultraviolet ring 102. The outside portion 114 and the center portion 112 can be formed similarly or differently. For example, the outside portion 114 can be formed from bowl 108 and the center portion 112 can be formed of a glaze with a non-ultraviolet pigment than the outside portion 114. In certain embodiments, multiple, alternating ultraviolet rings 102 and outside portions can be implemented on the inside of the bowl 108.

One or more textures 116 can be added to an inside of the bowl 108 to further aid the bees from slipping. For example, one or more textures 116 can include radial ridges, concentric ridges, spiral ridges, bumps, etc. The one or more texture 116 can be formed on the inside surface of the bowl 108 prior to curing of the insect watering station 100. The one or more texture 116 can be found in each of the center portion 112, the ultraviolet ring 102, and the outside portion 114. In certain embodiments, ridges can be implemented with bumps between each of the ridges. The one or more textures can be formed on the inside of the bowl 108 prior to firing of the insect watering station 100. In certain embodiments, textures can be added after the firing of the insect watering station 100 but prior to applying any specific glaze.

Although FIGS. 1A and 1B illustrate an example insect watering station 100 with an ultraviolet ring 102, various changes may be made to FIGS. 1A and 1B. For example, various components in FIGS. 1A and 1B may be combined, further subdivided, replicated, omitted, or rearranged and additional components may be added according to particular needs.

Figure 2A:
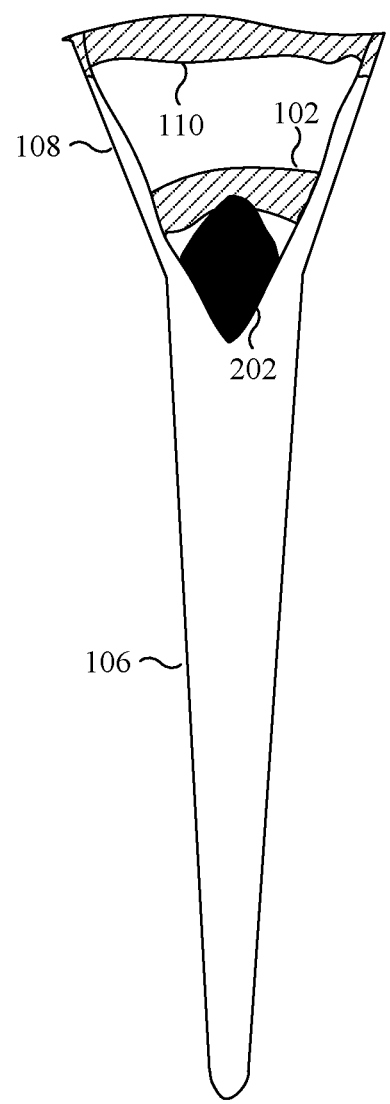
FIGS. 2A and 2B illustrate an example insect watering station with a mid-mound in accordance with this disclosure.
Figure 2B:
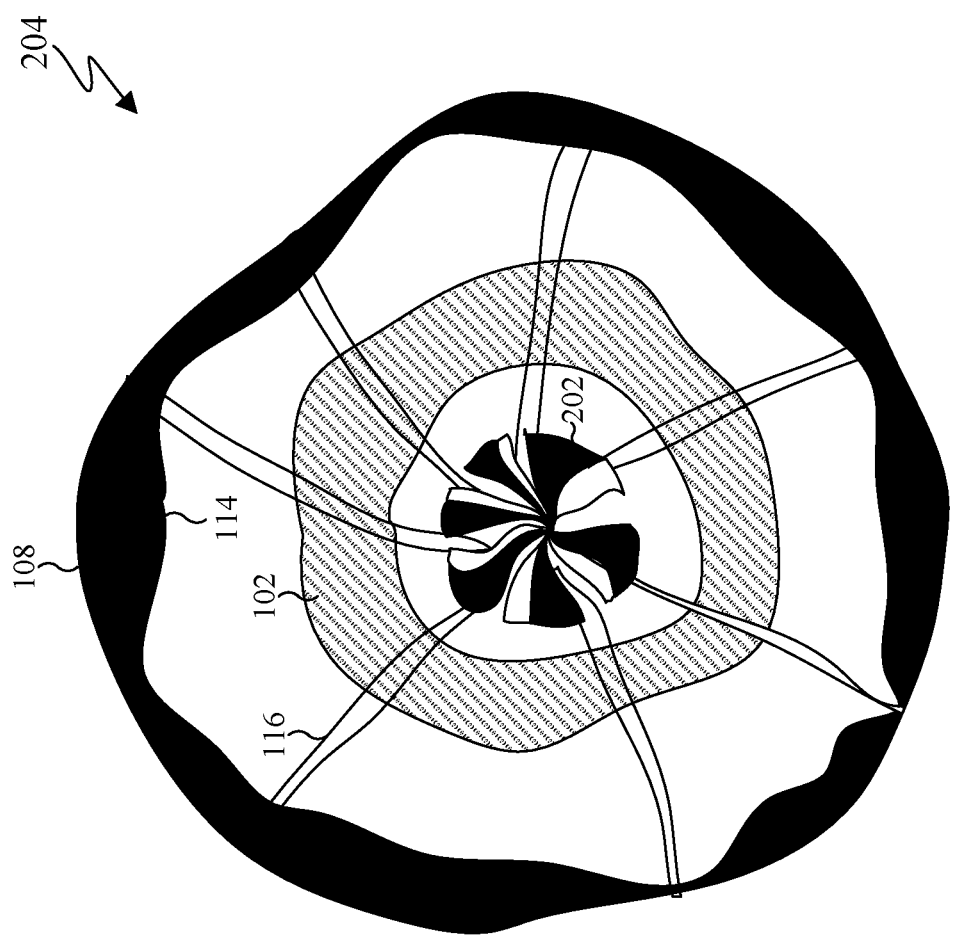

FIGS. 2A and 2B illustrate an example insect watering station 200 with a mid-mound 202 in accordance with this disclosure. In particular, FIG. 2A illustrates an example insect watering station 200 with a mid-mound 202 and FIG. 2B illustrates an example ultraviolet pattern 204 for insect watering station 200 with a mid-mound 202.

As shown in FIGS. 2A and 2B, the insect watering station 200 can include a mid-mound 202. The mid-mound 202 can be porcelain formed as a rise in a center of the bowl 108. The mid-mound 202 can be integral to the bowl 108. The mid-mound 202 can have added pigments that provide a different color from the bowl 108. The mid-mound 202 can extend up to a top of the bowl 108.

The mid-mound 202 can be made of porcelain in a contrasting color from the porcelain of the bowl 108. The contrasting color mimics the contrast in the center of flowers to help pollinators identify a food source. The ultraviolet glaze in the ultraviolet ring 102 circling the mid-mound 202 can help identify the insect watering station 200 as a food source. Generally, bee vision is attracted to a bright ultraviolet pattern, such as ultraviolet ring 102, around a non-ultraviolet center, such as the coloring of the mid-mound 202. The mid-mounds 202 can be attached to the bowl 108 prior to firing the insect watering station 200 to maturity. Mid-mounds 202 may not be capable of absorbing minerals due to the clay being vitrified.

Although FIGS. 2A and 2B illustrate an example insect watering station 200 with a mid-mound 202, various changes may be made to FIGS. 2A and 2B. For example, various components in FIGS. 2A and 2B may be combined, further subdivided, replicated, omitted, or rearranged and additional components may be added according to particular needs.

Figure 3A:
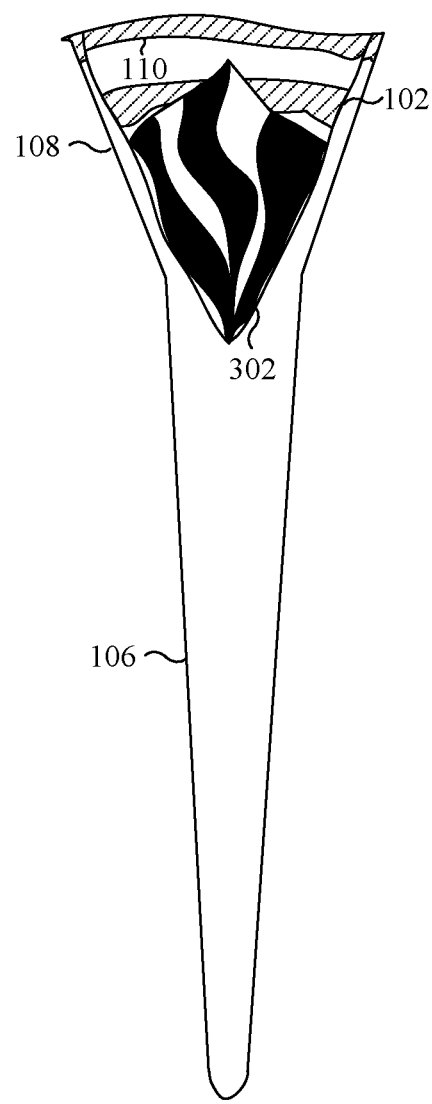
FIGS. 3A and 3B illustrate an example insect watering station with a porous tab in accordance with this disclosure.
Figure 3B:
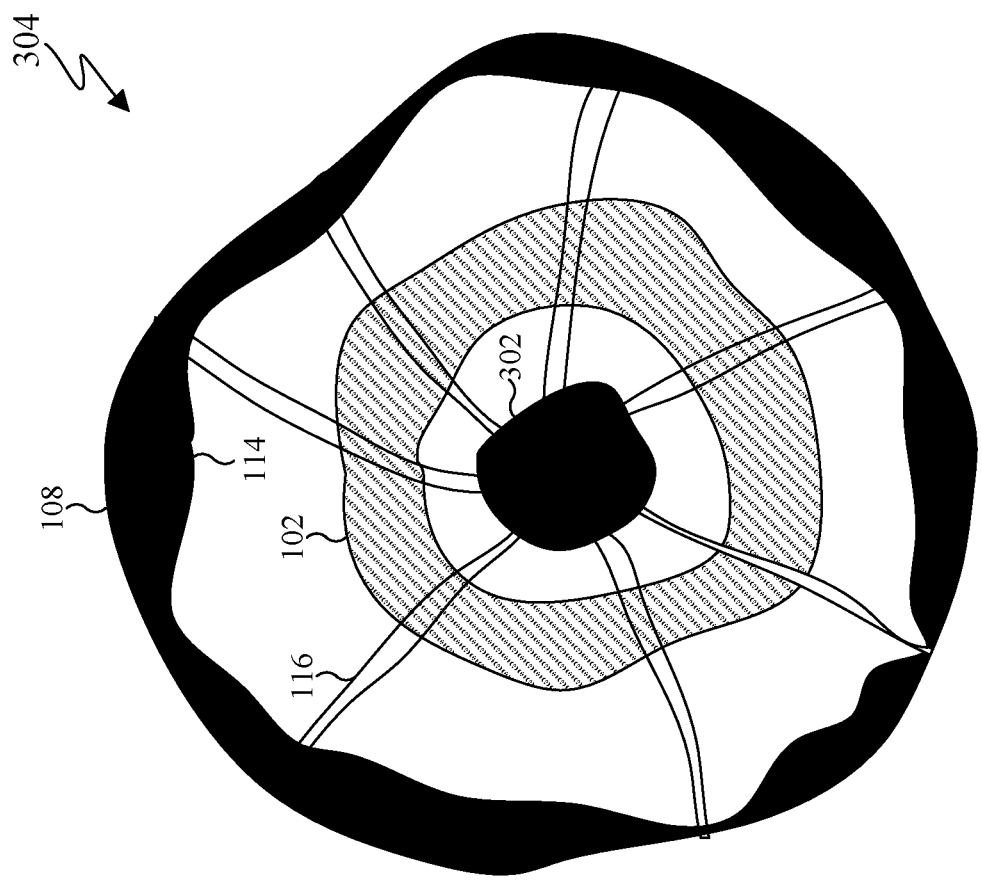

FIGS. 3A and 3B illustrate an example insect watering station 300 with a porous tab 302 in accordance with this disclosure. In particular, FIG. 3A illustrates an example insect watering station 300, FIG. 2B illustrates an example ultraviolet pattern 304 for an insect watering station 300 with a porous tab 302.

As shown in FIGS. 3A and 3B, a porous tab 302 can be added to the bowl 108. The porous tab 302 can be formed of a porous ceramic clay fired to cone 08 temperature. The low-firing temperature creates a brittle clay object that will biodegrade relatively quickly without releasing any toxic particles into the environment. The porous tab 302 can be shaped to fit into a based on the inside of the bowl 108 of the insect watering station 300. The sides of the porous tab 302 can be fluted to create more surface area to hold minerals. A size of the porous tab 302 can vary based on a target insect or bird. For example, a larger porous tab 302 can accommodate larger water bodies used for sustaining beneficial insects or hummingbirds. The porous tab 302 can include fluted sides to increase surface area for holding minerals.

In certain embodiments, the porous tab 302 can be a salty tab. The porous tabs 302 can be formed of a porous clay that is soaked in a solution of mineral salts or salt minerals. The porous tabs 302 can be loaded, after drying, into the bowl 108 and the salt will slowly leach back into water captured in the bowl 108. Salty tabs are beneficial to butterflies, especially male butterflies preparing to mate.

In certain embodiments, the porous tab 302 can be a sweet tablet. The porous tabs 302 can be fired porous clay that is soaked in a solution of sugar water or sugar minerals. The porous tabs 302 can be loaded, after drying, into the bowl 108 and the sugar will slowly leach back into water captured in the bowl 108. Sweet tablets are beneficial to bees and other sugar seeking animals.

Although FIGS. 3A and 3B illustrate an example insect watering station 300 with a porous tab 302, various changes may be made to FIGS. 3A and 3B. For example, various components in FIGS. 3A and 3B may be combined, further subdivided, replicated, omitted, or rearranged and additional components may be added according to particular needs.

Figure 4A:
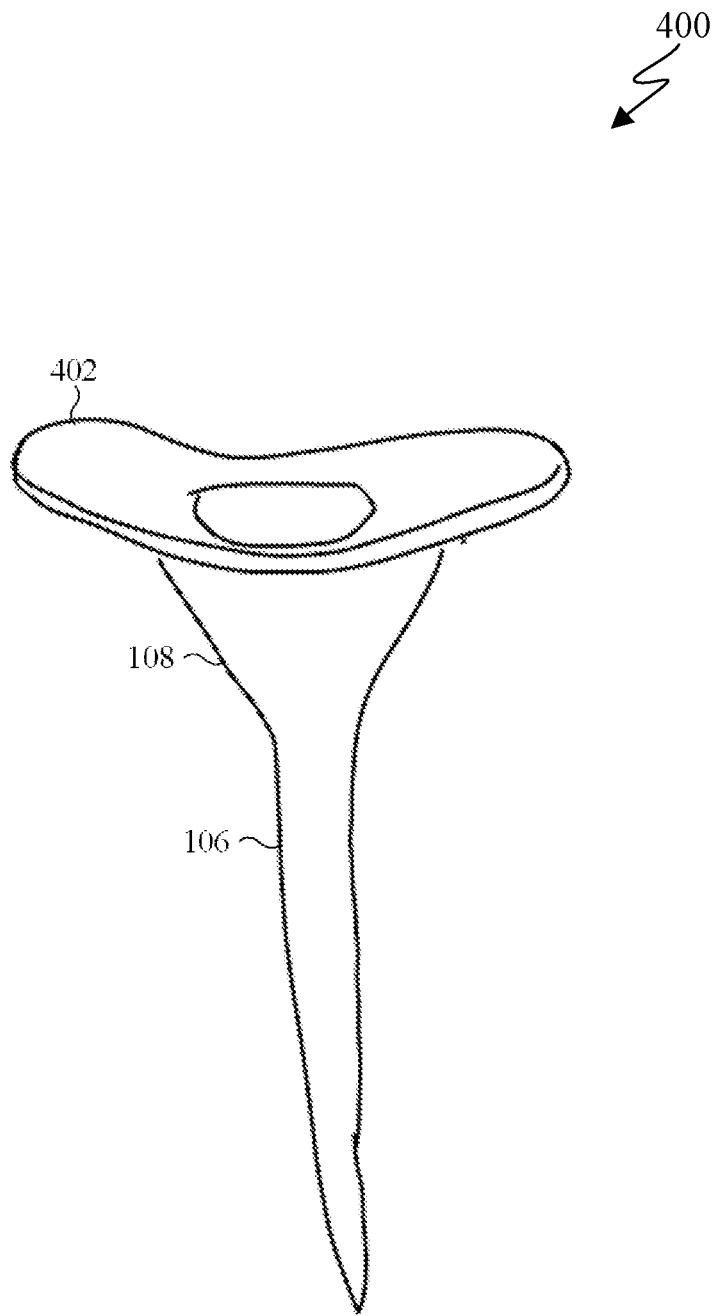
FIGS. 4A and 4B illustrate an example insect watering station with a landing pad in accordance with this disclosure.
Figure 4B:
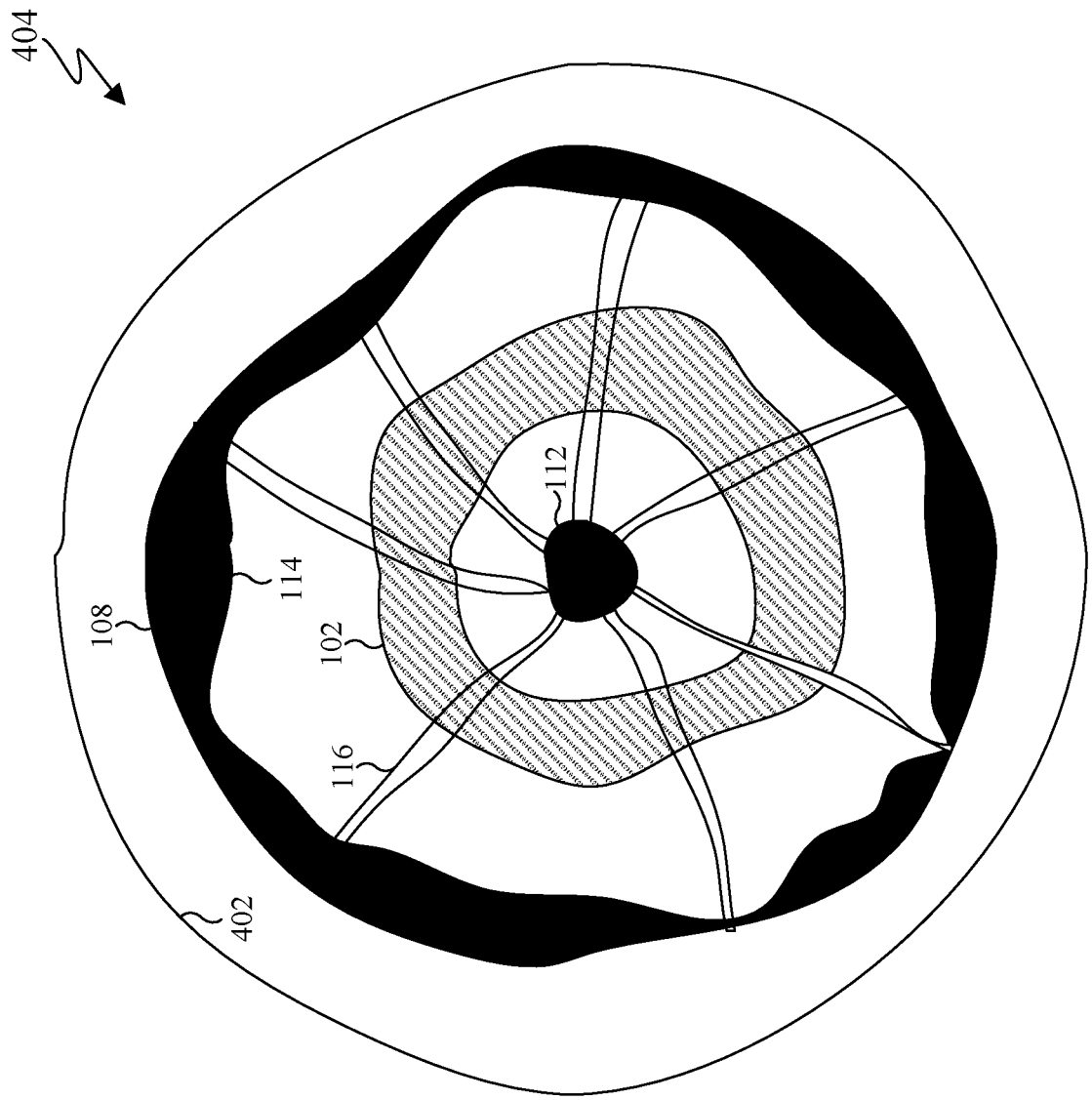

FIGS. 4A and 4B illustrate an example insect watering station 400 with a landing pad 402 in accordance with this disclosure. In particular, FIG. 4A illustrates an example insect watering station 400 and FIG. 4B illustrates an example ultraviolet pattern 404 for an insect watering station 400 with a landing pad 402.

As shown in FIGS. 4A and 4B, an insect watering station 400 with a landing pad 402 can include a smaller bowl 108 that is designed to hold ¼ of a teaspoon of water. The ultraviolet pattern 404 can extend into the landing pad 402. The landing pad can be approximately two inches in diameter with a one inch depth. The ultraviolet ring 102 can be implemented on the landing pad 402.

The landing pad 402 can be made of porcelain in a contrasting color from the porcelain of the bowl 108. As contrasting color mimics the contrast in the center of flowers to help pollinators identify a food source, the landing pad 402 can include additional rings of non-ultraviolet alternating with ultraviolet glaze in an additional ultraviolet ring 102. The landing pad 402 can be attached to the bowl 108 prior to firing the insect watering station 200 to maturity. landing pad 402 may not be capable of absorbing minerals due to the clay being vitrified. In certain embodiments, the non-ultraviolet concentric rings on the landing pad are formed using non-ultraviolet pigments in an impermeable ceramic.

In certain embodiments, the landing pad 402 can be formed of a porous material. Salt minerals or sugar minerals are stored in the porous material of the landing pad. The salt minerals or sugar minerals can be absorbed into water that is collected by the landing pad 402 into the bowl.

Although FIGS. 4A and 4B illustrate an example insect watering station 400 with a landing pad 402, various changes may be made to FIGS. 4A and 4B. For example, various components in FIGS. 4A and 4B may be combined, further subdivided, replicated, omitted, or rearranged and additional components may be added according to particular needs.

Figure 5A:
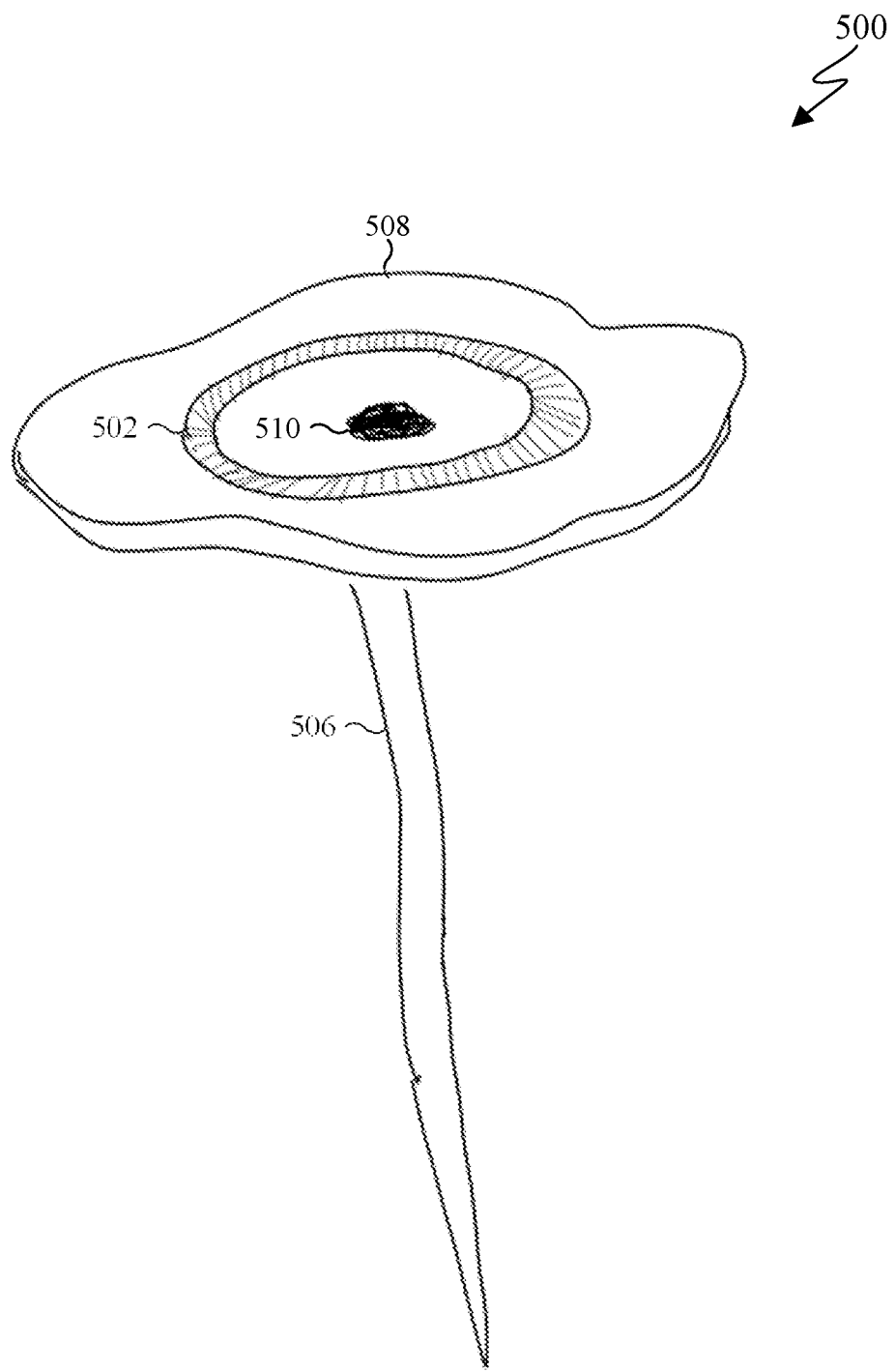
FIGS. 5A and 5B illustrate an example an artificial flower with ultraviolet ring in accordance with this disclosure.
Figure 5B:
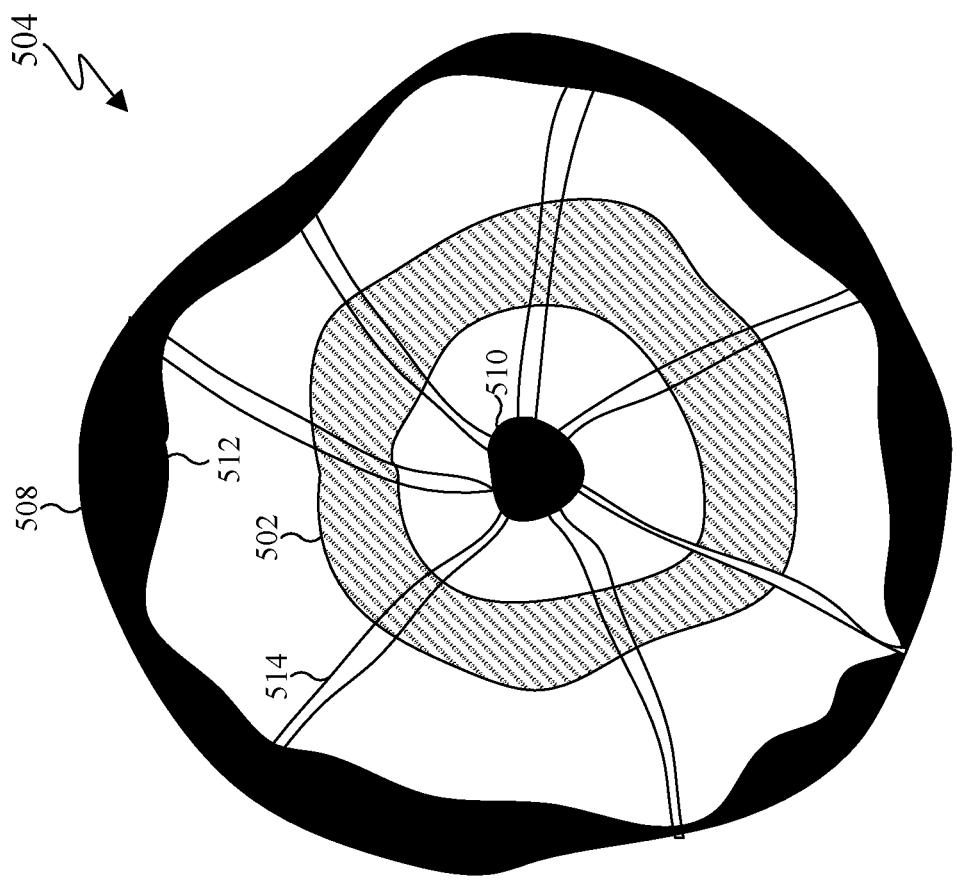

FIGS. 5A and 5B illustrate an example artificial flower 500 with an ultraviolet ring 502 in accordance with this disclosure. In particular, FIG. 5A illustrates an example artificial flower 500 and FIG. 5B illustrates an example ultraviolet pattern 504 including an ultraviolet ring 502 for an artificial flower 500.

As shown in FIGS. 5A and 5B, artificial flowers 500 with an ultraviolet ring 502 can attracted bees and other pollinating insects and animals. The artificial flower 500 can be added to areas requiring pollinating. For example, many crops and other vegetation that burn in a fire may no longer properly attract pollinating insects to the specific field. One or more artificial flowers 500 can be placed in the field to attract the bees to the area. Before the bees realize that the artificial flowers are fake, the bees will have already flow close enough effectively depositing the pollen into the field and the bees and other pollinating animals who have flow close to artificial flowers may pollinate new growth in the field.

The artificial flowers 500 The artificial flower 500 includes a stem 506 and a disk 508. In certain embodiments, the overall height of the artificial flower 500 can be six to twelve inches. However, the height of the artificial flower 500 is not limited to this range. In certain embodiments, pigments can be added to the porcelain to create artificial flower 500 that is colored different from a natural porcelain color. Use of pigments in clay or porcelain are light fast and do not substantially fade over time.

The stem 506 can be inserted into the ground to provide stability for the artificial flower 500. The stem 506 also can elevate the disk 508 from the ground in order to keep ground based insects from the bees drinking water out of the disk 508. In certain embodiments, the stem can be approximately 2.5 inches to 3 inches or in a range from approximately 75% to approximately 85% of the total length of the artificial flower 500. In certain embodiments, the stem 506 can be formed of a compostable material.

The disk 508 can be shaped to attract bees and other pollinating insects. The stem 506 can be attached to a bottom side of the disk 508 A circumference of a top rim of the disk 508 can be in a range from approximately 2 inches to approximately 3 inches. The disk 508 can be made of a porcelain material or a non-plastic material. The material of the disk 508 is important to maintain a healthy environment for the bees and not do further damage to the bee environment. Porcelain and other similar materials can be durable, able to hold water, and impermeable to bacteria. For example, the disk 508 could be made of stoneware or terracotta. The stem 506 can be made from a different material than the disk 508. For instance, the stem 506 does not need to be able to hold water. The artificial flower 500 can be heated to over 2200 degree Fahrenheit. Also, porcelain has a very low water absorption rate, which helps prevent bacteria from forming in or on the artificial flower 500.

The top side of the disk 508 can have an ultraviolet pattern 504 that mimics the petals and arrangement of a flower. The ultraviolet pattern 504 can include the ultraviolet ring 502, a center portion 510, an outside portion 512, and one or more textures 514. The ultraviolet pattern 104 can designed in a bullseye pattern with the "target" being the center portion 510. The bullseye pattern can be composed of alternating non-ultraviolet and ultraviolet concentric rings according to bee vision. The bullseye pattern can have a non-ultraviolet center portion 510 and a non-ultraviolet outside portion 512. While illustrated using a single ultraviolet ring 502 for a bullseye pattern, multiple ultraviolet rings 502 can be utilized in an ultraviolet pattern 104 for an artificial flower 500.

The ultraviolet ring 502 can be a glaze with rare earth minerals or formed from other methods for including ultraviolet characteristics in a glaze. The glaze can include a range of rare earth minerals from 0.25% to 12%, such as using a range from 1% to 4% rare earth minerals in a glaze. However, the range of rare earth minerals is not limited to these ranges. The glaze can be applied and fired to cone 6 (^6) temperature for the glaze. Other firing temperatures are possible depending on a type of clay and glass forming glaze chemicals used in the recipe. A range of firing temperatures could be used from ^5 to ^10. For example, samarium oxide, yttrium oxide, or terbium oxide can be the rare earth mineral that can be added to the glaze for the ultraviolet ring 502. These chemicals might also be used in the carbonite form instead of an oxide form.

As mentioned previously, the center portion 510 of the disk 508 can be formed of a non-ultraviolet circle. The center portion 510 can be the material of the disk 508 including any added pigments. The center portion 510 can also be a glaze with a different non-ultraviolet color added to a separate glaze from the ultraviolet ring 502. The center portion 510 can be an entire area of the disk 508 inside of the ultraviolet ring 502.

As mentioned previously, the outside portion 512 of the top side of the disk 508 can be formed of a non-ultraviolet ring. The outside portion 512 can be the material of the disk 508 including any added pigments. The outside portion 512 can also be a glaze with a different non-ultraviolet color added to a separate glaze from the ultraviolet ring 502. The outside portion 512 can cover an entire area of the disk 508 outside of the ultraviolet ring 502. The outside portion 512 and the center portion 510 can be formed similarly or differently. For example, the outside portion 512 can be formed from disk 508 and the center portion 510 can be formed of a glaze with a non-ultraviolet pigment than the outside portion 512. The outside portion 512 of the disk 508 can be translucent. The translucent portion can be a thickness where the material used to form the disk 508 is translucent. The translucent portion 110 allows the disk 508 to mimic translucent portion of a flower further attracting bee vision.

One or more textures 514 can be added to the topside of the disk 508 to enhance the appearance of the artificial flower 500. For example, one or more textures 514 can include radial ridges, concentric ridges, spiral ridges, bumps, etc. The one or more textures 514 can be formed on the surface of the disk 508 prior to curing of the insect watering station 100. The one or more texture 514 can be found in each of the center portion 510, the ultraviolet ring 502, and the outside portion 512. In certain embodiments, ridges can be implemented with bumps between each of the ridges.

Although FIGS. 5A and 5B illustrate an example artificial flower 500 with an ultraviolet ring 502, various changes may be made to FIGS. 5A and 5B. For example, various components in FIGS. 5A and 5B may be combined, further subdivided, replicated, omitted, or rearranged and additional components may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U. S. C. § 112(f) with respect to any of the appended claims or claim elements unless the exact words "means for" or "step for" are explicitly used in the particular claim, followed by a participle phrase identifying a function.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An insect watering station for attracting bees comprising:
   a bowl configured to capture water;
   a mid-mound extending from a surface of the bowl;
   a stem attached to an outside surface of the bowl and configured to support the bowl; and
   an ultraviolet pattern applied to an inside surface of the bowl, the ultraviolet pattern comprising:
      a center portion of a non-ultraviolet color applied to the mid-mound; and
      alternating ultraviolet and non-ultraviolet concentric rings around the center portion.

2. The insect watering station of claim 1, wherein the ultraviolet concentric rings are formed of a ceramic glaze including a rare earth mineral.

3. The insect watering station of claim 2, wherein the rare earth mineral is at least one of samarium oxide, yttrium oxide, and terbium oxide.

4. The insect watering station of claim 2, wherein the rare earth mineral is at least one of samarium carbonite, yttrium carbonite, and terbium carbonite.

5. The insect watering station of claim 1, wherein the non-ultraviolet color of the non-ultraviolet concentric rings is a brighter color than the non-ultraviolet color of the center portion.

6. The insect watering station of claim 1, wherein the bowl is formed of an impermeable ceramic that includes non-ultraviolet color pigments at the center portion.

7. The insect watering station of claim 1, wherein the bowl is formed of an impermeable ceramic that includes non-ultraviolet color pigments at the non-ultraviolet concentric rings.

8. The insect watering station of claim 1, wherein a portion of the bowl is fired with a thickness that forms a translucent portion of the bowl.

9. The insect watering station of claim 1, wherein one or more textures are included on the inside surface of the bowl.

10. The insect watering station of claim 9, wherein the one or more textures includes at least one of one or more radial ridges, one or more spiral ridges, one or more concentric ridges, and bumps.

11. The insect watering station of claim 1, wherein:
the mid-mound is formed from an impermeable ceramic.

12. The insect watering station of claim 11, wherein surfaces of the mid-mound are fluted.

13. The insect watering station of claim 11, wherein the mid-mound is a non-ultraviolet color.

14. The insect watering station of claim 1, further comprising:
a porous tab including salt minerals or sugar minerals and configured to disseminate the salt minerals or the sugar minerals into the water captured by the bowl.

15. The insect watering station of claim 14, wherein surfaces of the porous tab are fluted.

16. The insect watering station of claim 14, wherein the porous tab is a non-ultraviolet color.

17. The insect watering station of claim 1, further comprising:
a landing pad extending from a rim of the bowl,
wherein the alternating ultraviolet and non-ultraviolet concentric rings extend on a top surface of the landing pad.

18. The insect watering station of claim 17, wherein the landing pad is formed of a porous material.

19. The insect watering station of claim 18, wherein salt minerals or sugar minerals are stored in the porous material of the landing pad.

20. The insect watering station of claim 17, wherein the non-ultraviolet concentric rings on the landing pad are formed using non-ultraviolet pigments in an impermeable ceramic.

\* \* \* \* \*

UNITED STATES PATENT AND TRADEMARK OFFICE
CERTIFICATE OF CORRECTION

PATENT NO. : 12,058,983 B2
APPLICATION NO. : 17/687430
DATED : August 13, 2024
INVENTOR(S) : Jennifer J. Rose Page 1 of 1

It is certified that error appears in the above-identified patent and that said Letters Patent is hereby corrected as shown below:

On the Title Page

Item (54), Line 1, and in the Specification, Column 1, Line 1, "BEE CUP" should read -- INSECT WATERING STATION --.

Signed and Sealed this
Eighteenth Day of March, 2025

Coke Morgan Stewart
*Acting Director of the United States Patent and Trademark Office*